US012625711B2

(12) United States Patent
Steinberg

(10) Patent No.: US 12,625,711 B2
(45) Date of Patent: May 12, 2026

(54) VOCABULARY TO CONTROL INSIGHT DELIVERY

(71) Applicant: Autodesk, Inc., San Francisco, CA (US)

(72) Inventor: Jonathan Simon Pascal Steinberg, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 157 days.

(21) Appl. No.: 18/425,250

(22) Filed: Jan. 29, 2024

(65) Prior Publication Data

US 2025/0245029 A1     Jul. 31, 2025

(51) Int. Cl.
G06F 9/451 (2018.01)

(52) U.S. Cl.
CPC ..................................... G06F 9/453 (2018.02)

(58) Field of Classification Search
CPC ........................................................ G06F 9/453
See application file for complete search history.

(56) References Cited

U.S. PATENT DOCUMENTS

| 6,275,788 | B1 * | 8/2001 | Watanabe | ............... | G06F 40/20 |
| | | | | | 704/275 |
| 8,903,921 | B1 * | 12/2014 | Snow | .................. | G06F 16/9535 |
| | | | | | 709/204 |

| 10,698,706 | B1 * | 6/2020 | Rabe | ..................... | G06F 3/0484 |
| 11,520,947 | B1 * | 12/2022 | Serackis | ................. | G06F 9/451 |
| 11,676,231 | B1 * | 6/2023 | Crouse | .................. | G06F 16/906 |
| | | | | | 707/723 |
| 12,045,918 | B2 * | 7/2024 | Grossman | ............. | G06T 11/206 |
| 12,113,873 | B2 * | 10/2024 | Matejka | ................. | G06F 9/451 |
| 2002/0049882 | A1 * | 4/2002 | Maslov | .............. | G06F 16/9027 |
| | | | | | 707/E17.112 |
| 2016/0381658 | A1 | 12/2016 | Ghosh et al. | | |
| 2017/0315689 | A1 * | 11/2017 | Myhre | .................. | G06F 3/0482 |
| 2020/0133451 | A1 * | 4/2020 | Grossman | ............. | G06F 3/0481 |
| 2020/0133819 | A1 * | 4/2020 | Grossman | .......... | G09B 19/0053 |
| 2023/0297908 | A1 * | 9/2023 | Jagadeesan | .......... | G06Q 10/105 |
| | | | | | 705/7.14 |

OTHER PUBLICATIONS

Extended European Search Report dated Dec. 20, 2024 for European Patent Application No. 241913233.5.

* cited by examiner

*Primary Examiner* — Tadesse Hailu
(74) *Attorney, Agent, or Firm* — Gates & Cooper LLP

(57) ABSTRACT

A computer-implemented method and system provide for insights/recommendations to a user of a software product. A computer application autonomously determines a count of distinct commands executed by a user. Based on the count, the computer application autonomously determines the insight that includes a feature or new distinct command. The computer application then autonomously recommends the insight to the user.

18 Claims, 5 Drawing Sheets

VOCABULARY TO CONTROL INSIGHT DELIVERY

BACKGROUND OF THE INVENTION

1. Field of the Invention

The present invention relates generally to improving user proficiency with computer software, and in particular, to a method, apparatus, system, and article of manufacture for determining how, when, and where insights are provided to a user to improve their efficiency and/or knowledge.

2. Description of the Related Art

When a user begins using a software product (e.g., a trial user), they often know nothing about the product and/or how to use the product. Further, for an intermediate user to become an advanced/experienced user, that user needs to learn additional commands/actions/processes on the software. To develop a user's skill and increase their proficiency with the product, it may be useful to provide insights and/or suggested commands/actions that the user should learn/become familiar with. In particular, it is desirable to determine what insights to display as well as the timing and cadence of delivering insights to the user/customer.

Prior art systems attempted to control insight cadence using session count (one session is the time the product runs from launch until the user quits) as the trigger. In other words, session count merely looked at the lapsed/total time the user used a product. However, such an approach is inadequate as it is both insufficiently granular and extremely variable amongst the target population, and resulted in a mediocre correlation to desired outcome.

SUMMARY OF THE INVENTION

Embodiments of the invention provide suggestions to users within a computer application based on their behaviors. Content to suggest is curated based on a level of proficiency that a user has with a particular product. Such a curation may be based on an analysis of how advanced the user's actions are. More specifically, in one or more embodiments, a count of unique commands executed by the user is maintained as a "vocabulary". This vocabulary may then be compared to the vocabularies of ideal, different or more advanced users to determine which commands to recommend/place into insights provided to the user. The selection of which commands and the pace of delivery of the commands may all be autonomously determined based on modeling a range of different types of users of a software product and an attempt to shift users from trial users to commercial users.

BRIEF DESCRIPTION OF THE DRAWINGS

Referring now to the drawings in which like reference numbers represent corresponding parts throughout.

DETAILED DESCRIPTION OF THE INVENTION

Figure 1:
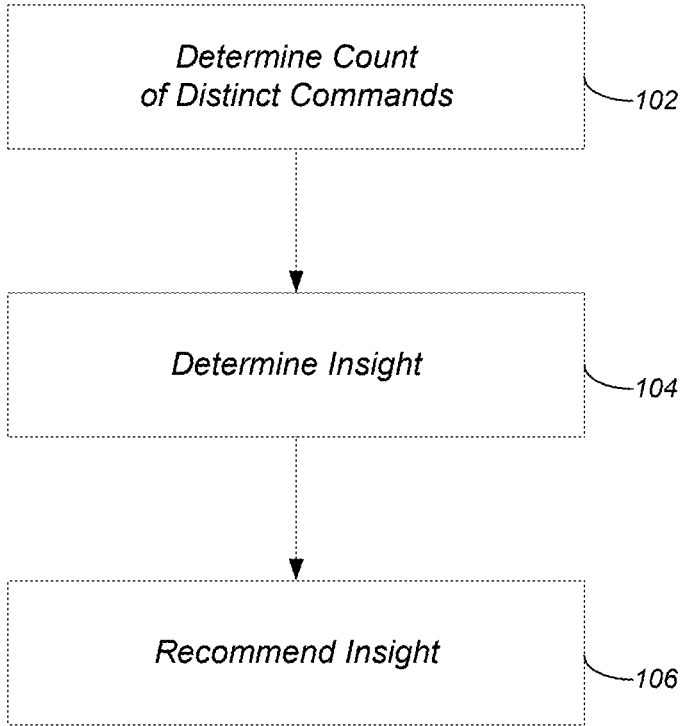
FIG. 1 illustrates the logical flow for providing an insight in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention address two inter-related problems/challenges: (1) measuring how "proficient" users are (and whether the embodiments of the invention are actually improving their proficiency); and (2) deciding on the timing and cadence of delivering the insight to the customer—it is undesirable to deliver insights that are too advanced before a user is ready, or have too many insights displayed at the same time. Embodiments of the invention provide "insights" to users based on their product usage. As used herein, insights are typically recommendations of features or commands that would be useful to that individual.
Vocabulary Measurement Embodiments of the invention measure the user's "vocabulary"—the count of distinct (unique) commands executed by the user within a software product (e.g., first-time and/or trial users of a product such as AUTODESK FUSION360, AUTOCAD, REVIT, etc.) cumulatively from their first usage throughout a trial period (e.g., a defined period of time). Embodiments of the invention may also isolate the data that represents "human triggered" commands from automatic and program issued data. The general idea is that users—especially new users during a trial period may execute just a few commands in total or many hundreds of commands (but mostly repeats of commands they've used before). However, evidence that they are learning to use the product can be easily gauged by measuring unique command usage.

Analysis was done to compare the progression of vocabulary growth of two segments of users from historical data; (1) trial users who subsequently became subscribers vs. (2) trial users who subsequently churned out (i.e. ceased to use the software). This demonstrated there was a distinct difference in the vocabulary growth rate and the total vocabulary achieved between the two groups. This historical data may be viewed on two different curves representing the different user segments. The goal is to then try to shift users from segment (2) to the users in segment (1) (i.e., to shift the users that churn out to users that become/continue subscriptions and become more advanced users).

In view of the above, embodiments of the invention use "vocabulary" (or the vocabular measurement) as one of the trigger conditions to cause insights to be shown to customers. In other words, vocabulary growth is being used as a proxy to measure a user's proficiency with a product. As described above, the measure of the user's "vocabulary" consists/comprises the count of distinct (unique) commands executed by the user (e.g., trial users in a software product such as AUTODESK FUSION360, AUTOCAD, REVIT, etc.) cumulatively from their first usage throughout the trial period. In one or more embodiments, insight triggers may be based directly on users' actions (user issues a command) and/or their history of usage, or lack of an action (i.e., a user not issuing a command). Further, in one or more embodiments, no direct measurement of proficiency may be conducted/used (i.e., other than the use of vocabulary/vocabulary growth as a measure of proficiency).

Based on the use of insights, embodiments of the invention improve the user's proficiency. Proficient users are more likely to be satisfied with a software product and as such, are more likely to continue to be subscribers. The insights may provide suggested commands to the users in order to help them progress and become more proficient with a product.

Embodiments of the invention may utilize a variety of mechanisms to determine/select which insights to present. In one or more embodiments, the selection of which insights (and the timing of the insights) is based on the analysis/model of users that became proficient users in the past. Embodiments may also (or instead of prior analysis) may be based on knowledge from subject matter experts (SMEs) that are familiar with/considered experts with a particular product. The analysis/SMEs may indicate that certain work/commands should not/cannot be performed before proficiency with a different command is acquired. Further, as a user's vocabulary grows, more subtle, complex, and nuanced commands may be proposed/suggested within an insight. Further, embodiments of the invention may specifically not suggest a command (within an insight) if the user has already used that command in the past (or demonstrated a level of proficiency with such a command—e.g., utilized a command a threshold minimum number of times or viewed/walked through a wizard explaining how to use a command, etc.).

Logical Flow

FIG. 1 illustrates the logical flow for providing an insight in accordance with one or more embodiments of the invention.

At step 102, a computer application autonomously (i.e., automatically, independently, and without any additional user input) determines a count of distinct (i.e., unique) commands executed by a user (e.g., on a computer application executing locally and/or on a server via received data). Such a determination may include isolating data representing human triggered commands from automatic commands and program issued data.

In one or more embodiments, the count determination may also include determining a modal state of the application when each distinct command is executed. Thereafter, a separate count may be determined for each modal state. For example, depending on the context and mode of the application (e.g., if the user is in a 2D sketch mode or a 3D modeling mode or a design detail/formatting mode), different command may need to be suggested/recommended and as such, different counts for the different modes may be maintained/determined. In this regard, the vocabulary count may be determined independently for each mode/state.

In one or more embodiments, the determination of the count may also include determining that a new distinct command is a synonym or variant of another distinct command that has already been included in the count. Thereafter, based on the determining (that the new distinct command is a synonym or variant) the new distinct command is not included in the count. For example, command that may be variants of each other may not need to be counted twice (e.g., "save" and "save as"). In this regard, different variants of the same command may be grouped together with no need to differentiate between/amongst them.

Further, in one or more embodiments of the invention, stop words/commands may be utilized. In this regard, a list of stop commands may be maintained. The system/computer application then recognizes that the distinct command is in the list. Based on the recognizing, the distinct command is not included in the count.

At step 104, based on the count, the computer application autonomously determines the insight. As used herein, the insight is a feature or new distinct command.

As part of determining the insight, one or more embodiments may maintain a skill tree that provides/includes/consists of a taxonomy of one or more classifications of a user's skills. A set of the distinct commands is then linked to a first classification of the one or more classifications. A task is determined for the user. Based on the task and the user's skills, the set is selected. Further, the insight is then autonomously determined based on the selected set. As part of the skill tree embodiments, embodiments may also include the identification of a first distinct command based on input from the user (e.g., a desired or attempt to execute a task/command). Embodiments may then determine where the first distinct command is located in the skill tree. Thereafter, the set may be selected based on where the first distinct command is located in the skill tree. In this regard, vocabularies may be linked to distinct categories of a user's skills (and not necessarily to a user itself). While some products may have several thousand distinct commands, some commands may be unique to very complex operations (associated with a specific skill set) and some are commands may be very simple/foundational. Embodiments of the invention help the user learn and gain proficiency at the level and pace that is relevant to them.

In one or more embodiments, the autonomously determining of the insight may be based on historical data over a defined time period (e.g., the past 30, 60, 90 days). Such historical data may set forth/provide/consist of the distinct commands the user has executed and the distinct commands the user has not executed over the defined time period.

In one or more embodiments, the insights may be autonomously determined based on a hierarchical organization of the distinct commands.

As described above, the autonomous determination of the insight may be based on an analysis of two user segments/populations/groups. Accordingly, in one or more embodiments, a first vocabulary growth curve may be determined for a first group of users. Such a first vocabulary growth curve represents the count of a first set of distinct commands executed by users in the first group. Further, a second vocabulary growth curve may be determined for a second group of users. Such a second vocabulary growth curve represents the count of a second set of distinct commands executed by users in the second group. The first vocabulary growth curve may then be compared to the second vocabulary growth curve to determine a growth rate difference. In addition, the first set of distinct commands may be compared to the second set of distinct commands to determine a total vocabulary achievement difference. Thereafter, the autonomous determination of the insight may be based on the growth rate difference and the total vocabulary achievement difference. In this regard, a vocabulary growth curve may be viewed as a proxy for proficiency between different types of users. The desire is to shift users by giving them new commands to make a growth curve of a first group more like the second group (e.g., from a trial user's growth curve to a commercial user's growth curve).

At step 106, the computer application autonomously recommends/triggers the insight to the user. Such an autonomous recommendation may be via a tooltip/guide/message/ sound or other indication visual or otherwise to the user that provides/suggests/recommends the insight. In this regard, a users' vocabulary is measured and insights are triggered at certain points. Further, the trigger system may be complex such that an analysis may be conducted regarding when a user has executed a command in the prior 30, 60, or 90 days, with counts established and an analysis of whether the user has used commands in combination with each other or with another feature, and/or in the absence of another command/ feature. For example, when a user has a first started using an application and has a very low vocabulary, some basic commands may have a high tendency to trigger. However, as the vocabulary grows, more subtle and complex, and nuanced commands may be proposed/recommended within an insight.

In view of the above, embodiments of the invention may attempt to provide insights/recommendations to the user in a manner that attempts to predict what the user will desire to do next. The more accurate the prediction, the more likely the user will become a commercial/subscribing user of a product. Accordingly, embodiments of the invention may utilize a predictive model for commands/features a user is likely to use based on their historical use and current vocabulary count. The model may be unique to a particular user and is updated as the user's vocabulary of command usage grows over time.

Figure 2:
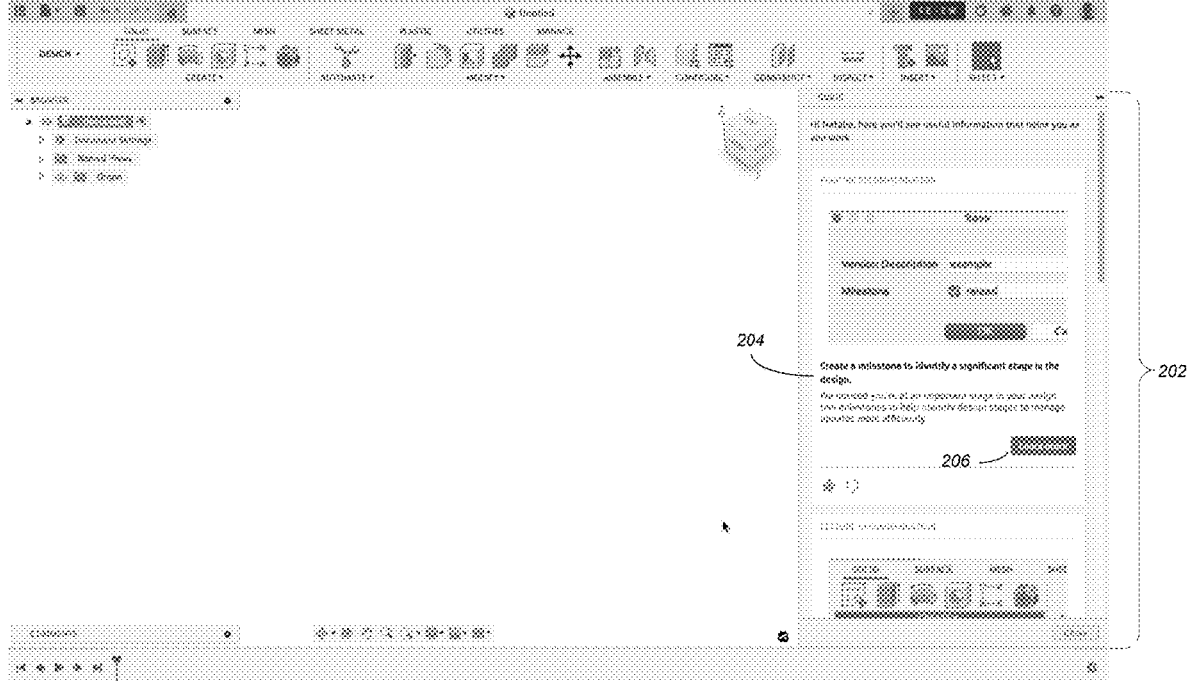
FIG. 2 illustrates a screen shot of the FUSION application that includes a displayed guide with the recommendation in accordance with one or more embodiments of the invention.

FIG. 2 illustrates a screen shot of the FUSION application that includes a displayed guide with the recommendation in accordance with one or more embodiments of the invention. The guide 202 recommends the use of a create milestone command 204 to create a milestone to identify a significant stage in the design. The guide further indicates at 206 that the application has noticed that the user is at an important stage in the design and that milestones may be used to help identify design stages to manage updates more efficiently. The user has the option to learn more by clicking on the "Learn More" button 208.

Figure 3:
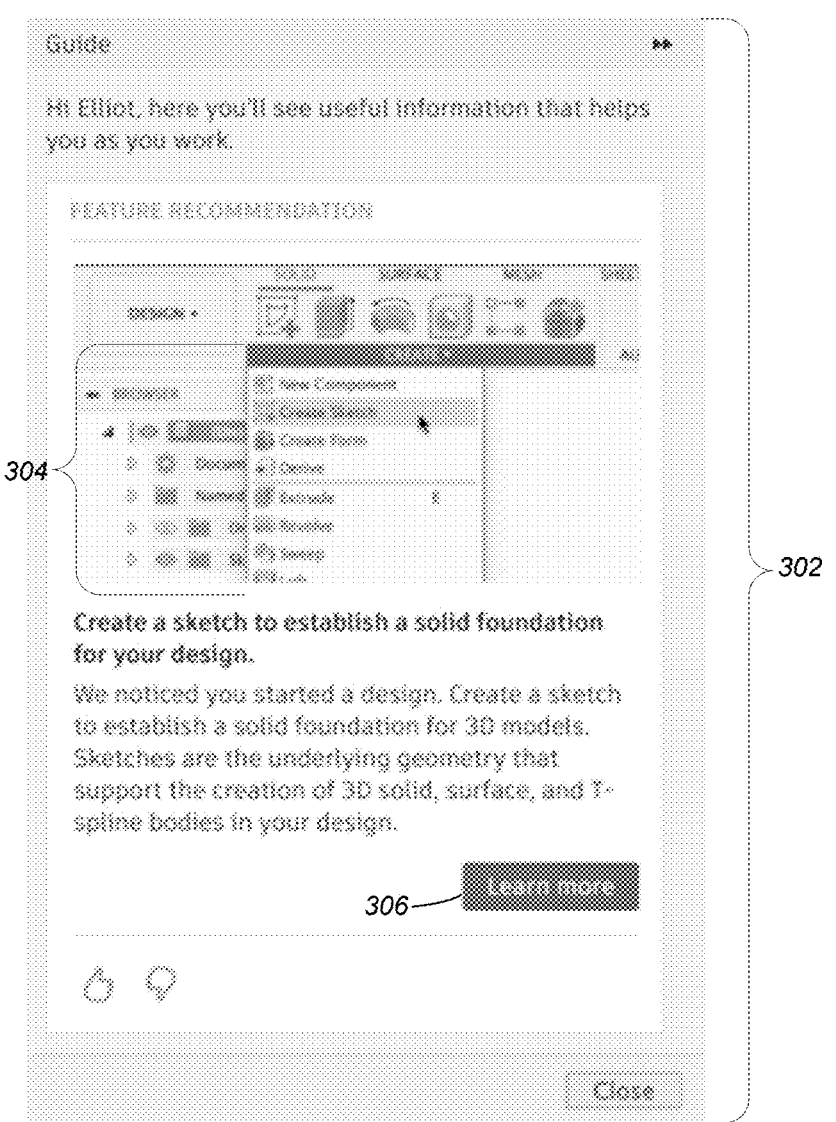
FIG. 3 illustrates a screen shot of a guide that includes a recommendation displayed in accordance with one or more embodiments of the invention.

FIG. 3 illustrates a screen shot of a guide that includes a recommendation displayed in accordance with one or more embodiments of the invention. As illustrated, the guide 302 is recommending a feature/command (and illustrating at 304 the menu command to utilize to perform the command) to create a sketch to establish a solid foundation for the design with the option to learn more at 306.

Hardware Environment

Figure 4:
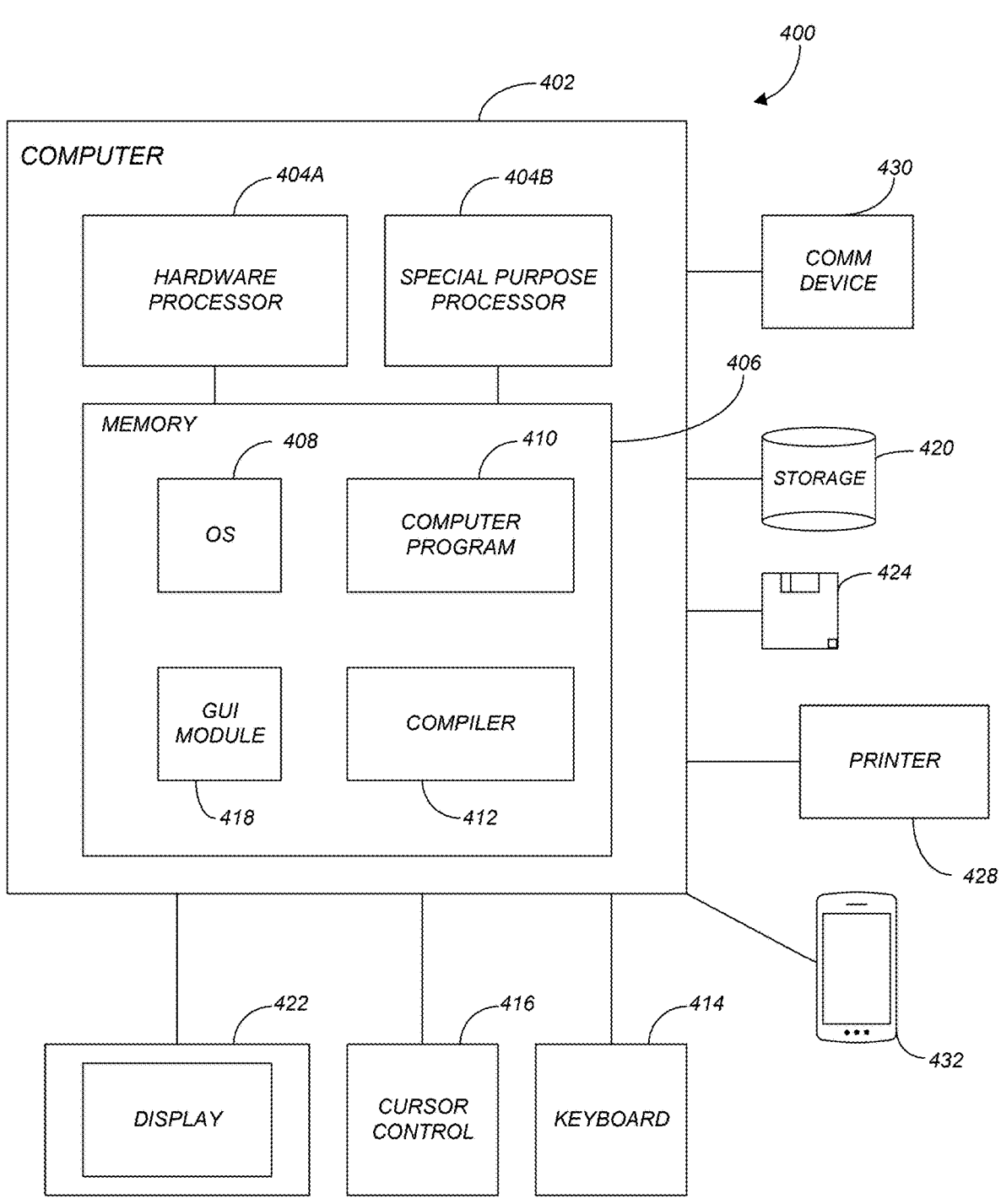
FIG. 4 is an exemplary hardware and software environment used to implement one or more embodiments of the invention.

FIG. 4 is an exemplary hardware and software environment 400 (referred to as a computer-implemented system and/or computer-implemented method) used to implement one or more embodiments of the invention. The hardware and software environment includes a computer 402 and may include peripherals. Computer 402 may be a user/client computer, server computer, or may be a database computer. The computer 402 comprises a hardware processor 404A and/or a special purpose hardware processor 404B (hereinafter alternatively collectively referred to as processor 404) and a memory 406, such as random access memory (RAM). The computer 402 may be coupled to, and/or integrated with, other devices, including input/output (I/O) devices such as a keyboard 414, a cursor control device 416 (e.g., a mouse, a pointing device, pen and tablet, touch screen, multi-touch device, etc.) and a printer 428. In one or more embodiments, computer 402 may be coupled to, or may comprise, a portable or media viewing/listening device 432 (e.g., an MP3 player, IPOD, NOOK, portable digital video player, cellular device, personal digital assistant, etc.). In yet another embodiment, the computer 402 may comprise a multi-touch device, mobile phone, gaming system, internet enabled television, television set top box, or other internet enabled device executing on various platforms and operating systems.

In one embodiment, the computer 402 operates by the hardware processor 404A performing instructions defined by the computer program 410 (e.g., a computer-aided design [CAD] application) under control of an operating system 408. The computer program 410 and/or the operating system 408 may be stored in the memory 406 and may interface with the user and/or other devices to accept input and commands and, based on such input and commands and the instructions defined by the computer program 410 and operating system 408, to provide output and results.

Output/results may be presented on the display 422 or provided to another device for presentation or further processing or action. In one embodiment, the display 422 comprises a liquid crystal display (LCD) having a plurality of separately addressable liquid crystals. Alternatively, the display 422 may comprise a light emitting diode (LED) display having clusters of red, green and blue diodes driven together to form full-color pixels. Each liquid crystal or pixel of the display 422 changes to an opaque or translucent state to form a part of the image on the display in response to the data or information generated by the processor 404 from the application of the instructions of the computer program 410 and/or operating system 408 to the input and commands. The image may be provided through a graphical user interface (GUI) module 418. Although the GUI module 418 is depicted as a separate module, the instructions performing the GUI functions can be resident or distributed in the operating system 408, the computer program 410, or implemented with special purpose memory and processors.

In one or more embodiments, the display 422 is integrated with/into the computer 402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/ handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 402 according to the computer program 410 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program 410 instructions. In one embodiment, the special purpose processor 404B is an application specific integrated circuit (ASIC).

The computer 402 may also implement a compiler 412 that allows an application or computer program 410 written in a programming language such as C, C++, Assembly, SQL, PYTHON, PROLOG, MATLAB, RUBY, RAILS, HASKELL, or other language to be translated into processor 404 readable code. Alternatively, the compiler 412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 410 accesses and manipulates data accepted from I/O devices and stored in the memory 406 of the computer 402 using the relationships and logic that were generated using the compiler 412.

The computer 402 also optionally comprises an external communication device such as a modem, satellite link, Ethernet card, or other device for accepting input from, and providing output to, other computers 402.

In one embodiment, instructions implementing the operating system 408, the computer program 410, and the compiler 412 are tangibly embodied in a non-transitory computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of computer program 410 instructions which, when accessed, read and executed by the computer 402, cause the computer 402 to perform the steps necessary to implement and/or use the present invention or to load the program of instructions into a memory 406, thus creating a special purpose data structure causing the computer 402 to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 402.

Figure 5:
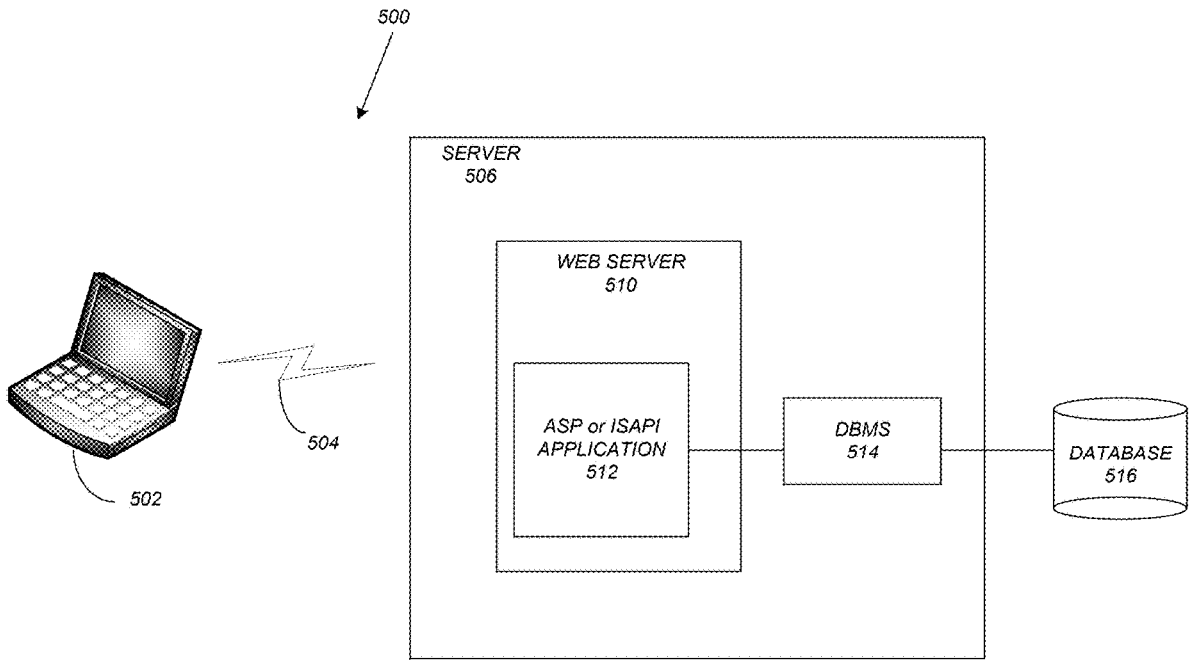
FIG. 5 schematically illustrates a typical distributed/cloud-based computer system utilized in accordance with one or more embodiments of the invention.

FIG. 5 schematically illustrates a typical distributed/cloud-based computer system 500 using a network 504 to connect client computers 502 to server computers 506. A typical combination of resources may include a network 504 comprising the Internet, LANs (local area networks), WANs (wide area networks), SNA (systems network architecture) networks, or the like, clients 502 that are personal computers or workstations (as set forth in FIG. 4), and servers 506 that are personal computers, workstations, minicomputers, or mainframes (as set forth in FIG. 4). However, it may be noted that different networks such as a cellular network (e.g., GSM [global system for mobile communications] or otherwise), a satellite based network, or any other type of network may be used to connect clients 502 and servers 506 in accordance with embodiments of the invention. In this regard, embodiments of the invention may be installed and utilized locally and/or may work in a real-time cloud based environment.

A network 504 such as the Internet connects clients 502 to server computers 506. Network 504 may utilize ethernet, coaxial cable, wireless communications, radio frequency (RF), etc. to connect and provide the communication between clients 502 and servers 506. Further, in a cloud-based computing system, resources (e.g., storage, processors, applications, memory, infrastructure, etc.) in clients 502 and server computers 506 may be shared by clients 502, server computers 506, and users across one or more networks. Resources may be shared by multiple users and can be dynamically reallocated per demand. In this regard, cloud computing may be referred to as a model for enabling access to a shared pool of configurable computing resources.

Clients 502 may execute a client application or web browser and communicate with server computers 506 executing web servers 510. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 502 may be downloaded from server computer 506 to client computers 502 and installed as a plug-in or ACTIVEX control of a web browser. Accordingly, clients 502 may utilize ACTIVEX components/component object model (COM) or distributed COM (DCOM) components to provide a user interface on a display of client 502. The web server 510 is typically a program such as MICROSOFT'S INTERNET INFORMATION SERVER.

Web server 510 may host an Active Server Page (ASP) or Internet Server Application Programming Interface (ISAPI) application 512, which may be executing scripts. The scripts invoke objects that execute business logic (referred to as business objects). The business objects then manipulate data in database 516 through a database management system (DBMS) 514. Alternatively, database 516 may be part of, or connected directly to, client 502 instead of communicating/obtaining the information from database 516 across network 504. When a developer encapsulates the business functionality into objects, the system may be referred to as a component object model (COM) system. Accordingly, the scripts executing on web server 510 (and/or application 512) invoke COM objects that implement the business logic. Further, server 506 may utilize MICROSOFT'S TRANSACTION SERVER (MTS) to access required data stored in database 516 via an interface such as ADO (Active Data Objects), OLE DB (Object Linking and Embedding Data-Base), or ODBC (Open DataBase Connectivity).

Generally, these components 500-516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 502 and 506 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 502 and 506. Embodiments of the invention are implemented as a software/CAD application on a client 502 or server computer 506. Further, as described above, the client 502 or server computer 506 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing an insight, comprising:

autonomously determining, in a computer application, a count of distinct commands executed by a user, wherein the autonomously determining the count comprises:

determining that a new distinct command is a synonym or variant of another distinct command that has already been included in the count; and based on the determining that the new distinct command is a synonym or variant, not including the new distinct command in the count;

based on the count, autonomously determining, in the computer application, the insight, wherein the insight comprises a feature or new distinct command; and autonomously recommending, via the computer application, the insight to the user.

2. The computer-implemented method of claim 1, wherein the autonomously determining the count comprises:

isolating data representing human triggered commands from automatic commands and program issued data.

3. The computer-implemented method of claim 1, wherein the autonomously determining the count comprises:

determining a modal state of the application when each distinct command is executed; and determining a separate count for each modal state.

4. The computer-implemented method of claim 1, wherein the autonomously determining the count comprises:

maintaining a list of stop commands;

recognizing that the distinct command is in the list; and based on the recognizing, not including the distinct command in the count.

5. The computer-implemented method of claim 1, further comprising:

maintaining a skill tree comprising a taxonomy of one or more classifications of a user's skills;

linking a set of the distinct commands to a first classification of the one or more classifications;

determining a task for the user; and selecting the set based on the task and the user's skills; and autonomously determining the insight based on the selected set.

6. The computer-implemented method of claim 5, further comprising:

identifying a first distinct command based on input from the user;

determining where the first distinct command is located in the skill tree; and selecting the set based on where the first distinct command is located in the skill tree.

7. The computer-implemented method of claim 1, wherein:

the autonomously determining the insight is based on historical data over a defined time period; and the historical data comprises the distinct commands the user has executed and the distinct commands the user has not executed over the defined time period.

8. The computer-implemented method of claim 1, wherein the insights are autonomously determined based on a hierarchical organization of the distinct commands.

9. The computer-implemented method of claim 1, further comprising:

determining a first vocabulary growth curve for a first group of users, wherein the first vocabulary growth curve represents the count of a first set of distinct commands executed by users in the first group;

determining a second vocabulary growth curve for a second group of users, wherein the second vocabulary growth curve represents the count of a second set of distinct commands executed by users in the second group;

comparing the first vocabulary growth curve to the second vocabulary growth curve to determine a growth rate difference; and comparing the first set of distinct commands to the second set of distinct commands to determine a total vocabulary achievement difference; and wherein the autonomously determining the insight is based on the growth rate difference and the total vocabulary achievement difference.

10. A computer-implemented system for providing an insight, comprising:

(a) a computer having a memory;

(b) a processor executing on the computer;

(c) the memory storing a set of instructions for a computer application, wherein the set of instructions, when executed by the processor cause the processor to perform operations comprising:

(i) autonomously determining a count of distinct commands executed by a user, wherein the autonomously determining the count comprises:

(1) determining that a new distinct command is a synonym or variant of another distinct command that has already been included in the count; and (2) based on the determining that the new distinct command is a synonym or variant, not including the new distinct command in the count;

(ii) based on the count, autonomously determining the insight, wherein the insight comprises a feature or new distinct command; and (iii) autonomously recommending the insight to the user.

11. The computer-implemented system of claim 10, wherein the autonomously determining the count comprises:

isolating data representing human triggered commands from automatic commands and program issued data.

12. The computer-implemented system of claim 10, wherein the autonomously determining the count comprises:

determining a modal state of the computer application when each distinct command is executed; and determining a separate count for each modal state.

13. The computer-implemented system of claim 10, wherein the autonomously determining the count comprises:

maintaining a list of stop commands;

recognizing that the distinct command is in the list; and based on the recognizing, not including the distinct command in the count.

14. The computer-implemented system of claim 10, the operations further comprising:

maintaining a skill tree comprising a taxonomy of one or more classifications of a user's skills;

linking a set of the distinct commands to a first classification of the one or more classifications;

determining a task for the user; and selecting the set based on the task and the user's skills; and autonomously determining the insight based on the selected set.

15. The computer-implemented system of claim 14, the operations further comprising:

identifying a first distinct command based on input from the user;

determining where the first distinct command is located in the skill tree; and selecting the set based on where the first distinct command is located in the skill tree.

16. The computer-implemented system of claim 10, wherein:

the autonomously determining the insight is based on historical data over a defined time period; and the historical data comprises the distinct commands the user has executed and the distinct commands the user has not executed over the defined time period.

17. The computer-implemented system of claim 10, wherein the insights are autonomously determined based on a hierarchical organization of the distinct commands.

18. The computer-implemented system of claim 10, the operations further comprising:

determining a first vocabulary growth curve for a first group of users, wherein the first vocabulary growth curve represents the count of a first set of distinct commands executed by users in the first group;

determining a second vocabulary growth curve for a second group of users, wherein the second vocabulary growth curve represents the count of a second set of distinct commands executed by users in the second group;

comparing the first vocabulary growth curve to the second vocabulary growth curve to determine a growth rate difference; and comparing the first set of distinct commands to the second set of distinct commands to determine a total vocabulary achievement difference; and wherein the autonomously determining the insight is based on the growth rate difference and the total vocabulary achievement difference.

* * * * *